United States Patent [19]
Kim

[11] Patent Number: 5,915,130
[45] Date of Patent: Jun. 22, 1999

[54] APPARATUS FOR TRANSMITTING AND RECEIVING DIGITAL DATA VIA SERIAL BUS BY GENERATING CLOCK SELECT AND TIMING SIGNALS AND BY PROVIDING DATA SYNCHRONIZED WITH A CLOCK SIGNAL

[75] Inventor: Jeong-Tae Kim, Seoul, Rep. of Korea

[73] Assignee: Samsung Electronics Co., Ltd., Kyungki-do, Rep. of Korea

[21] Appl. No.: 08/921,617

[22] Filed: Sep. 2, 1997

[30] Foreign Application Priority Data

Sep. 2, 1996 [KR] Rep. of Korea ............... 96-37899

[51] Int. Cl.$^6$ ................................................. G06F 13/00
[52] U.S. Cl. ..................... 395/888; 395/850; 395/286; 395/556; 345/520
[58] Field of Search ............................. 395/888, 850, 395/556, 286; 345/520

[56] References Cited

U.S. PATENT DOCUMENTS

| | | | |
|---|---|---|---|
| 4,479,119 | 10/1984 | Sakano | 345/26 |
| 5,424,733 | 6/1995 | Fimoff et al. | 341/67 |
| 5,483,659 | 1/1996 | Yamamura | 395/800.43 |
| 5,490,247 | 2/1996 | Tung et al. | 345/501 |
| 5,701,514 | 12/1997 | Keener et al. | 395/834 |
| 5,758,136 | 5/1998 | Carlson | 395/556 |

Primary Examiner—Thomas C. Lee
Assistant Examiner—Albert Wang
Attorney, Agent, or Firm—Sughrue, Mion, Zinn, Macpeak & Seas, PLLC

[57] ABSTRACT

A digital interface apparatus operable to transmit and receive non-compressed digital data can allow a data interface between digital image apparatuses such as a digital VCR and a digital camcorder and a computer. A transmission timing controller in the digital interface apparatus for transmitting and receiving digital data via an IEEE 1394 serial bus, generates a clock select signal and timing signals. A transmission memory records data to be transmitted in synchronization with the clock designated by the clock select signal according to the timing signals generated by the transmission timing controller and outputs the recorded data in synchronization with a third clock. A controller generates the third clock, adds additional information to the data output from the transmission memory to then be transmitted via the IEEE 1394 serial bus, receives data transmitted via the IEEE 1394 serial bus, and restores a frame signal from the information added in the received data. A reception timing controller generates the clock select signal and timing signals. A reception memory records data output from the controller in synchronization with the third clock supplied from the controller according to timing signals generated by the reception timing controller, and outputs the recorded data in synchronization with the clock designated by the clock select signal generated by the reception timing controller.

8 Claims, 4 Drawing Sheets

APPARATUS FOR TRANSMITTING AND RECEIVING DIGITAL DATA VIA SERIAL BUS BY GENERATING CLOCK SELECT AND TIMING SIGNALS AND BY PROVIDING DATA SYNCHRONIZED WITH A CLOCK SIGNAL

BACKGROUND OF THE INVENTION

The present invention relates to a digital interface apparatus, and more particularly, to a digital interface apparatus for transmitting and receiving non-compressed digital data.

Due to remarkable developments in the field of information communication, the data interface between image apparatuses has become the subject of brisk study. According to the specification of a standard definition (SD) digital video cassette recorder (VCR), a digital VCR should transmit compressed image data, audio data and subcode data via an IEEE 1394 serial bus. A data interface between digital image apparatuses 1 and 2 such as a digital VCR and a digital camcorder will be described with reference to FIG. 1. As shown in FIG. 1, the digital image apparatuses 1 and 2 have the same structure. Data transmission operation proceeds as follows when the first digital image apparatus 1 is used as an image input apparatus for the second digital image apparatus 2. In the first digital image apparatus 1, an image signal picked up by a camera 11 or an image signal input via an input end 19 is input to a source data processor 12. The source data processor 12 compresses the input image signal via a compression procedure according to the SD specification. The data compressed by the source data processor 12 is applied to a digital interface circuit 17 in order to be transmitted to the second digital image apparatus 2.

FIG. 2 is a circuit diagram of a conventional digital interface circuit. Digital interface apparatuses 17 and 27 which are contained in the digital image apparatuses 1 and 2, respectively, have the same structure. Hereinafter, the digital interface circuit 17 in the digital image apparatus 1 will be described below as an example.

In FIG. 2, an input/output controller 101 receives the data applied from the source data processor 12 as data to be transmitted. A transmission timing controller 102 receives an external frame signal in synchronization with the data to be transmitted. The transmission timing controller 102 uses the received frame signal to generate a write timing signal. The write timing signal is used as a control signal for writing data in a transmission first-in-first-out (FIFO) memory 103. When a write timing signal is applied from the transmission timing controller 102, data transmitted from the input/output controller 101 is subsequently stored in the transmission FIFO memory 103 in synchronization with an externally-supplied transmission system clock T_SYS CLK. The transmission data stored in the transmission FIFO memory 103 is output to a controller 104 at the time when the controller 104 desires. For doing so, the transmission timing controller 102 generates a read timing signal using the frame signal. The controller 104 generates clock CLK and supplies the generated clock to the transmission FIFO memory 103. When a read timing signal is applied from the transmission timing controller 102, the transmission data stored in the transmission FIFO memory 103 is read out in synchronization with the clock CLK supplied from the controller 104. The transmission timing controller 102 supplies the received frame signal to the controller 104. The controller 104 adds a cyclic redundancy code and a header to the transmission data read from the transmission FIFO memory 103. Information on the frame signal supplied from the transmission timing controller 102 and a transmission channel number is loaded on the header in order to restore the frame signal at a receiving end. The controller 104 outputs the transmission data on which the additional information is loaded, to a data transmission/reception portion 105. The data transmission/reception portion 105 converts the transmission data output from the controller 104 into an electrical signal to be output via a transmission channel. Also, the data transmission/reception portion 105 transmits the electrical signal to the second digital image apparatus 2 via a transmission channel in an IEEE 1394 serial bus.

An operation for transmitting the signal reproduced from a recording medium 14 in the first digital image apparatus 1 in order to be displayed on a monitor 26 in the second digital image apparatus 2 is as follows. The data read from the recording medium 14 is input to a channel data processor 13 and amplified by a predetermined amplification factor. The channel data processor 13 detects information data from the amplified data and corrects an error of the information data using an error correction code added during recording. The error-corrected data in the channel data processor 13 is applied to the digital interface circuit 17 and is transmitted to the second digital image apparatus 2 in the same manner as described above.

When data is transmitted from a digital interface circuit 27 in the second digital image apparatus 2, the digital interface circuit 17 receives the data transmitted via a reverse procedure of the above-described data transmission operation. In this case, when the received data is stored in a reception FIFO memory 107, the clock CLK supplied from the controller 104 is used, while when the received data is read from the reception FIFO memory 107, a reception system clock R_SYS CLK is used. The reception system clock R_SYS CLK is produced by a phase locked loop (PLL) 18 for receiving a frame signal. In the case where the data received by the digital interface circuit 17 is a signal output from a camera 21 or an input end 29 in the second digital image apparatus 2, the received data is applied to the channel data processor 13. The channel data processor 13 adds an error correction code to the received data and performs a 24/25 modulation. The modulated signal is recorded in recording medium 14. On the other hand, in the case where the received data is a signal read from a recording medium 24 in the second digital image apparatus 2, the received date is applied to a source data processor 12. The source data processor 12 expands (or decompresses) the received data. The expanded data is digital-to-analog-converted in a digital-to-analog (D/A) converter 15. The analog-converted signal is displayed on a monitor 16.

Such digital interface apparatuses are directed to the data interface between digital VCRs. However, the advent of multimedia permits a digital VCR to be linked with a computer. In this case, when a digital VCR is connected to a computer, data which is transmitted after being compressed cannot be used in the computer. Thus, in order to allow the computer to use the compressed data, a circuit for expanding the compressed data is added in the computer or the compressed data should be expanded by software. The former case requires an additional cost to be incurred, and the latter case causes the data not to be processed on a real-time basis.

SUMMARY OF THE INVENTION

To solve the above problems, it is an object of the present invention to provide a digital interface apparatus for making a digital VCR and a computer be compatible with each other by transmitting non-compressed digital data via an IEEE 1394 serial bus.

To accomplish the above object of the present invention, there is provided a digital interface apparatus operable to transmit and receive digital data via an IEEE 1394 serial bus, the digital interface apparatus comprising:

a transmission timing controller for generating a clock select signal which selects one of first and second clocks, each of said first and second clocks having a different frequency, according to a supplied mode signal, and generating timing signals by using a supplied frame signal; a transmission memory on which data to be transmitted is recorded in synchronization with the clock selected by the clock select signal according to the timing signals supplied from the transmission timing controller and from which the recorded data is output in synchronization with a third clock; control means for generating the third clock, adding additional information to the data output from the transmission memory to then be transmitted via the IEEE 1394 serial bus, receiving data transmitted via the IEEE 1394 serial bus, and restoring a frame signal from information added to the received data; a reception timing controller for generating the clock select signal which selects one of the first and second clocks according to the supplied mode signal, and generating timing signals by using the frame signal restored by the control means; and a reception memory on which data output from the control means is recorded in synchronization with the third clock supplied from the control means, according to the timing signals supplied from the reception timing controller, and from which the recorded data is output in synchronization with the clock designated by the clock select signal generated by reception timing controller.

BRIEF DESCRIPTION OF THE DRAWINGS

A preferred embodiment of the present invention is described with reference to the drawings, wherein.

DETAILED DESCRIPTION OF PREFERRED EMBODIMENT

A preferred embodiment of the present invention will be described with reference to the accompanying drawings FIGS. 3 and 4.

Figure 1:
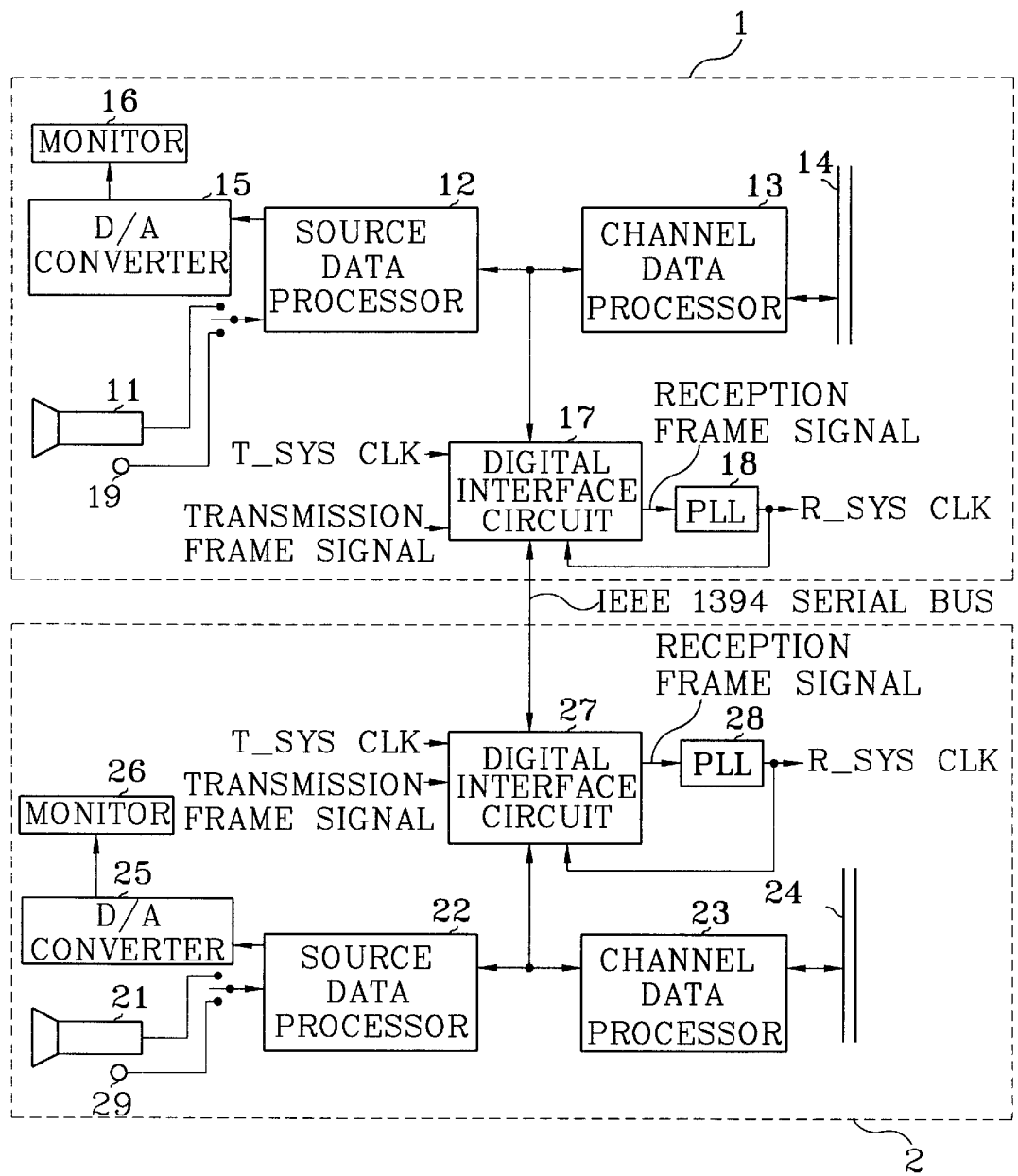
FIG. 1 shows a connection state between digital image apparatuses using conventional digital interface circuits.
Figure 3:
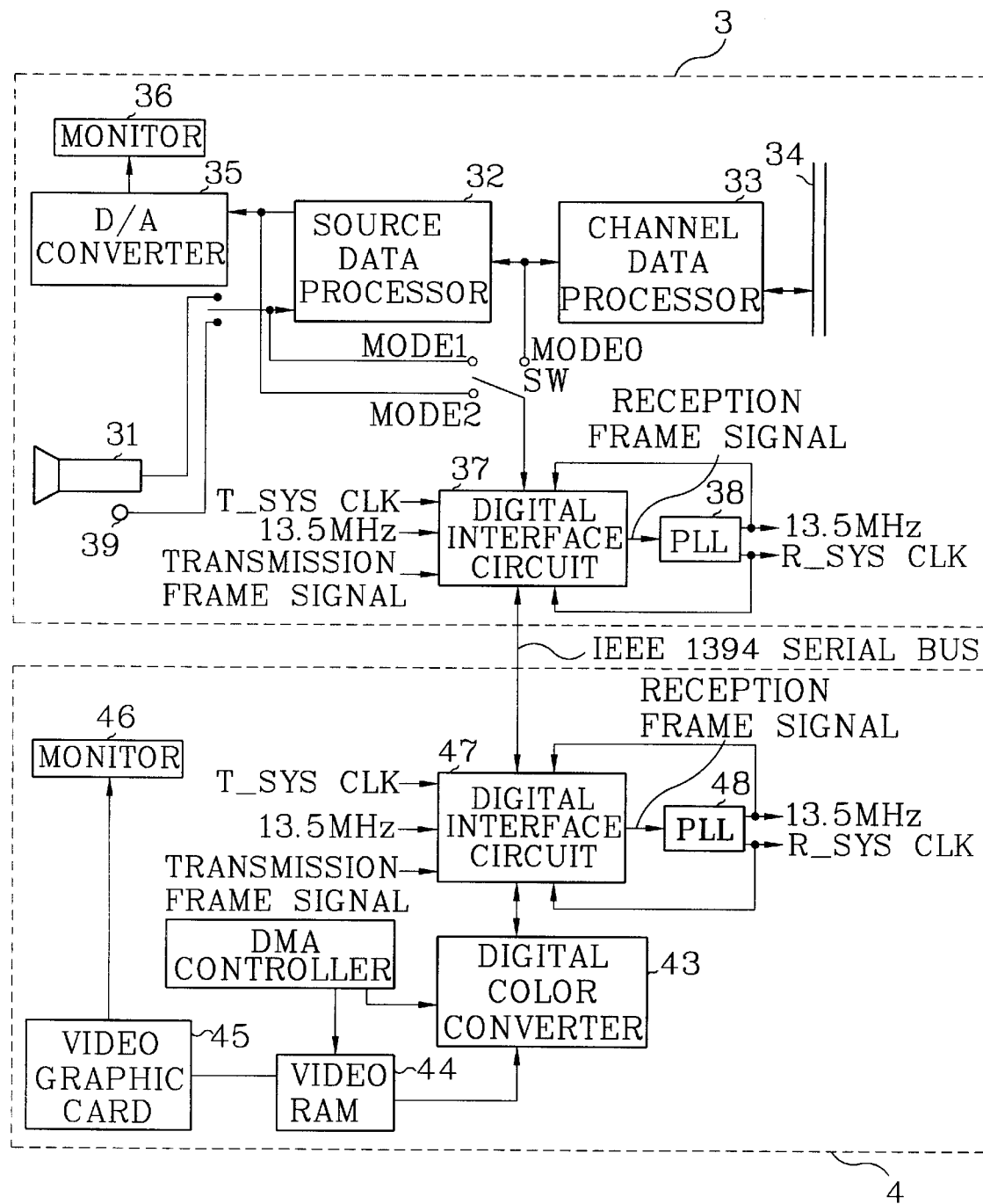
FIG. 3 shows a connection state between a digital image apparatus and a computer using digital interface circuits according to an embodiment of the present invention.

FIG. 3 shows a connection state between digital image apparatus 3 and a computer 4 via digital interface circuits according to a preferred embodiment of the present invention. The digital image apparatus 3 includes all the elements in the general digital image apparatuses 1 and 2 of FIG. 1. The digital image apparatus 3 further includes a switch SW for selecting one among compressed data MODE0 transmitted between a source data processor 32 and a channel data processor 33, non-compressed data MODE1 input via a camera 31 or an input end 39, and non-compressed data MODE2 output from the source data processor 32, and transmitting the selected result to a digital interface circuit 37.

The connection state of the switch SW is designated by a user who connects and uses the digital image apparatus 3 and the computer 4. For example, when the digital image apparatus 3 is a digital camcorder, it can be used as an image input unit for the computer 4. In this case, the moving contact of the switch SW is connected to a fixed contact for the data MODE1 according to the user's decision, to thereby transmit an image signal pickup by the camera 31 or an image signal input via the input end 39 to the digital interface circuit: 37. When the digital image apparatus 3 is a digital VCR, the computer 4 can be used as an image output unit. In this case, the moving contact of the switch SW is connected to a fixed contact for the data MODE2 according to a user's decision, to thereby transmit the data output from the source data processor 32 to the digital interface circuit 37. In the above cases, the image signal picked up by the camera 31, the image signal input via the input end 39 and the signal output from the source data processor 32 are data sampled using a sampling frequency of 13.5 MHz and are non-compressed data having a sampled CCIR 601 format. An operation for the transmission of the non-compressed data will be described with reference to FIG. 4.

Figure 2:
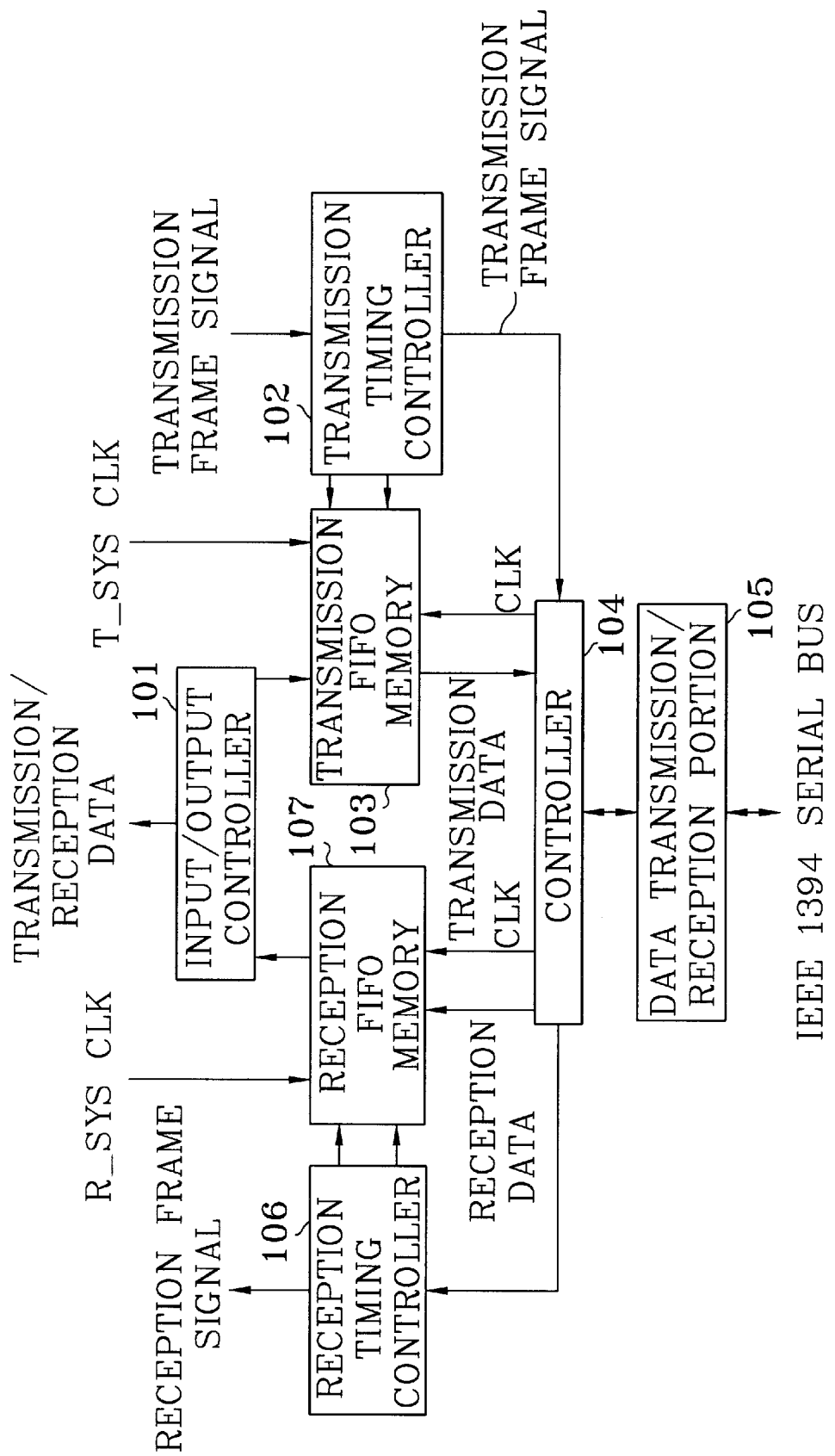
FIG. 2 is a detailed circuit diagram showing a conventional digital interface circuit.
Figure 4:
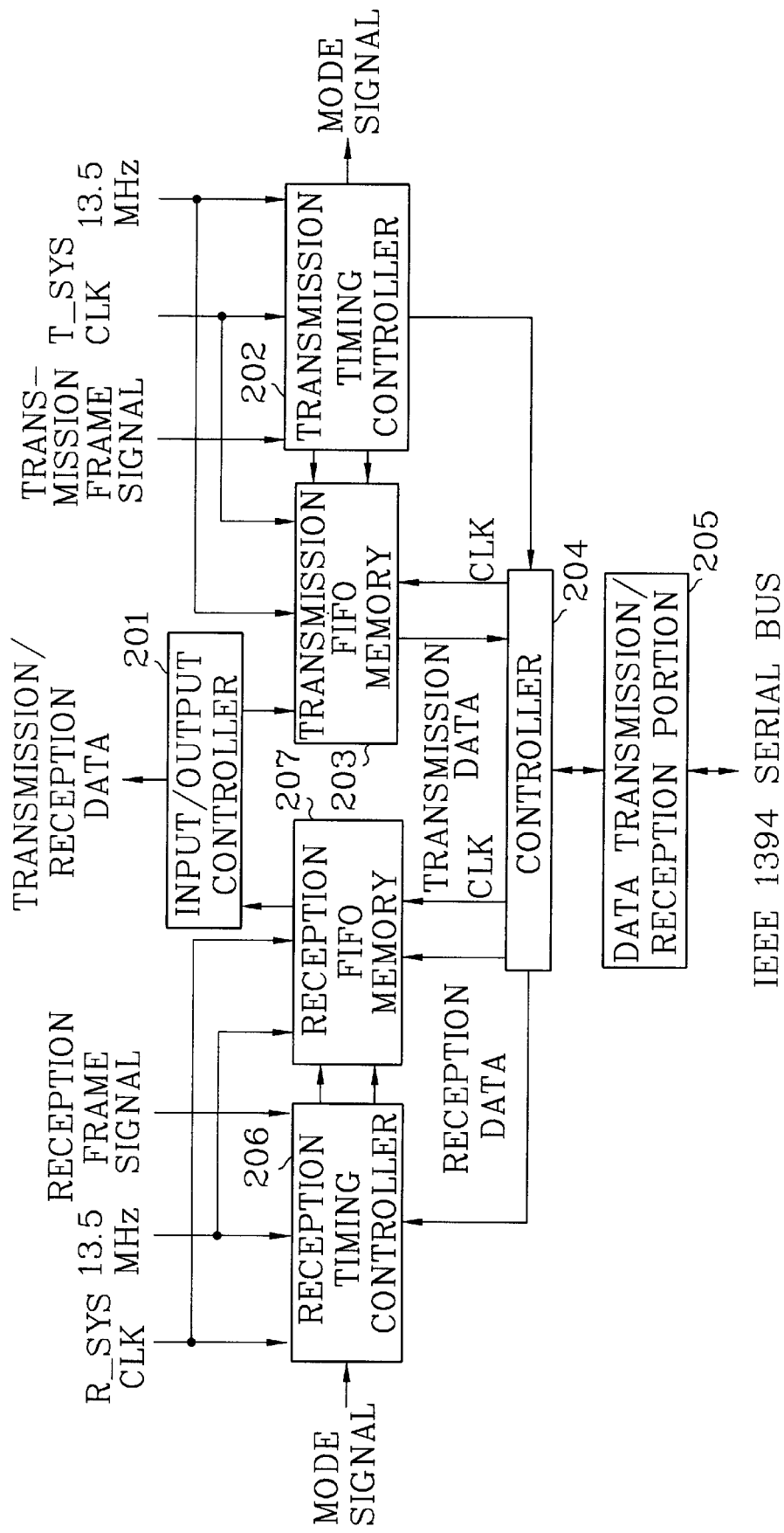
FIG. 4 is a detailed circuit diagram showing the digital interface circuit according to the present invention.

An input/output controller 201 in the digital interface circuit 37 having the structure of FIG. 4 receives the non-compressed data as transmission data. A transmission timing controller 202 receives a frame signal which is synchronized with the transmission data, a transmission system clock T_SYS CLK and a clock having a frequency of 13.5 MHz. The transmission timing controller 202 generates a clock select signal for selecting a clock of 13.5 MHz according to an externally-supplied mode signal for non-compressed data, and supplies the generated clock select signal to a transmission FIFO memory 203. Also, the transmission timing controller 202 uses the received frame signal to generate a write timing signal. According to the write timing signal, the transmission data output from the input/output controller 201 is stored in the transmission FIFO memory 203 in synchronization with the 13.5 MHz clock. The amount of the non-compressed data stored in the transmission FIFO memory 203 is larger than that of the compressed data. Thus, the transmission FIFO memory 203 has a larger amount of capacity than the transmission FIFO memory 103 shown in FIG. 2. When a read timing signal is applied from the transmission timing controller 202, the transmission data stored in the transmission FIFO memory 203 is read in synchronization with the clock CLK supplied from the controller 204. Meanwhile, the transmission timing controller 202 supplies the frame signal to the controller 204. The controller 204 adds a cyclic redundancy code and a header to the data read from the transmission FIFO memory 203, and outputs the result to the data transmission/reception portion 205. The data transmission/reception portion 205 transmits the transmission data output from the controller 204 via the IEEE 1394 serial bus. The compressed data is transmitted via the IEEE 1394 serial bus, at 100 Mbit/sec speed according to the IEEE 1394 recommendation. However, to transmit the non-compressed data having a relatively larger amount of data, a transmission speed should be faster than that of the compressed data. Therefore, the non-compressed data can be transmitted via a transmission channel at a speed of approximately 200 Mbit/sec according to the CCIR 601 format.

If the non-compressed data is transmitted from the digital image apparatus 3 as described above, the digital interface circuit 47 in the computer 4 having the construction shown in FIG. 4 receives the data transmitted from the digital interface circuit 37 in the digital image apparatus 3. The data transmission/reception portion 205 in the digital interface circuit 47 receives the transmitted data and outputs the received data to the controller 204. The controller 204 separates the additional information added during transmission from the received data output from the data transmission/reception portion 205, restores the frame signal and supplies the restored frame signal to the reception timing controller 206. According to the write timing signal from the reception timing controller 206, the received data from which the additional information has been separated by the controller 204, is stored in the reception FIFO memory 207 in synchronization with the clock CLK supplied from the controller 204. The data stored in the reception FIFO memory 207 is read out in synchronization with the 13.5 MHz clock under the control of the reception timing controller 206 which generates the clock select signal according to a mode signal. A PLL 48 produces either system clock or the 13.5 MHz clock according to the restored frame signal and supplies the result to the digital interface circuit 47.

The data received via the digital interface circuit 47 is applied to a digital color converter 43 in the computer 4. The digital color converter 43 converts the received data into color signals R, G and B which can be used in the computer. A DMA controller 42 generates a sync signal from the frame signal supplied from the digital interface circuit 47. The DMA controller 42 supplies the sync signal to the digital color converter 43 and synchronizes the received data having the CCIR 601 format with the color signals. The DMA controller 42 generates address values for recording the color signals output from the digital color converter 43 in a video RAM 44 and supplies the result to the video RAM 44. The color signals output from the digital color converter 43 are recorded at the position in the video RAM 44, which is designated by the address value generated in the DMA controller 42. The signal recorded in the video RAM 44 is displayed on a monitor 46 via a graphic card 45.

Meanwhile, when the moving contact of the switch SW shown in FIG. 3 is connected to the fixed contact for the data MODE0, the digital interface circuit 37 transmits compressed data. In this case, the transmission system clock is selected as the clock for recording the transmission data in the transmission FIFO memory 203, while the reception system clock is selected as the clock for reading the received data from the reception FIFO memory 207.

The computer 4 captures several frames of the data transmitted from the digital image apparatus 3 and stores the captured result therein as files.

The digital interface circuit, the digital color converter, and the DMA controller included in the computer 4 are implemented in an add-on board form to be added on slots, which can use a video RAM and a graphic card in the computer.

In the above-described embodiment, the data transmitted to the computer is the sampled data using the CCIR 601 format. However, the non-compressed data can be transmitted to the computer. In this case, if the digital color converter in the computer converts the received data into the color signals of the CCIR 601 format, a circuit for converting the received signal into that of the CCIR 601 format is provided on the input end of the digital color converter.

As described above, the digital interface apparatus for transmitting and receiving non-compressed digital data according to the present invention can allow a data interface between a digital VCR or a digital camcorder and a computer.

While only a certain embodiment of the invention has been specifically described herein, it will be apparent that numerous modifications may be made thereto without departing from the spirit and scope of the invention.

What is claimed is:

1. A digital interface apparatus operable to transmit and receive digital data via an IEEE 1394 serial bus, the digital interface apparatus comprising:

a transmission timing controller for generating a clock select signal which selects one of first and second clocks, each of said first and second clocks having a different frequency, according to a supplied mode signal, and generating timing signals by using a supplied frame signal;

a transmission memory on which data to be transmitted is recorded in synchronization with the clock selected by the clock select signal according to the timing signals supplied from the transmission timing controller and from which the recorded data is output in synchronization with a third clock;

control means for generating the third clock, adding additional information to the data output from the transmission memory to then be transmitted via the IEEE 1394 serial bus, receiving data transmitted via the IEEE 1394 serial bus, and restoring a frame signal from information added to the received data;

a reception timing controller for generating the clock select signal which selects one of the first and second clocks according to the supplied mode signal, and generating timing signals by using the frame signal restored by the control means; and a reception memory on which data output from the control means is recorded in synchronization with the third clock supplied from the control means, according to the timing signals supplied from the reception timing controller, and from which the recorded data is output in synchronization with the clock selected by the clock select signal generated by reception timing controller.

2. The digital interface apparatus according to claim 1, wherein a data interface is implemented between a computer and one of a digital VCR and a digital camcorder.

3. A digital interface apparatus operable to transmit and receive digital data via an IEEE 1394 serial bus, the digital interface apparatus comprising:

a transmission timing controller for generating a clock select signal which selects one of first and second clocks, each of said first and second clocks having a different frequency, according to a supplied mode signal, and generating timing signals by using a supplied frame signal;

a transmission memory on which data to be transmitted is recorded in synchronization with the clock selected by the clock select signal according to the timing signals supplied from the transmission timing controller and from which the recorded data is output in synchronization with a third clock;

control means for generating the third clock, adding additional information to the data output from the transmission memory to then be transmitted via the IEEE 1394 serial bus, receiving data transmitted via the IEEE 1394 serial bus, and restoring a frame signal from information added to the received data;

a reception timing controller for generating the clock select signal which selects one of the first and second clocks according to the supplied mode signal, and generating timing signals by using the frame signal restored by the control means; and a reception memory on which data output from the control means is recorded in synchronization with the third clock supplied from the control means, according to the timing signals supplied from the reception timing controller, and from which the recorded data is output in synchronization with the clock selected by the clock select signal generated by reception timing controller;

wherein one of said transmission timing controller and said reception timing controller generates the clock select signal for selecting said first clock when said mode signal indicates that compressed data is to be conveyed through the IEEE 1394 serial bus, and selecting said second clock when said mode signal indicates that non-compressed data is to be conveyed through the IEEE 1394 serial bus.

4. The digital interface apparatus according to claim 3, wherein said non-compressed data is data sampled according to a CCIR 601 format.

5. The digital interface apparatus according to claim 4, wherein said first clock is a system clock and said second clock is a clock having a 13.5 MHz frequency.

6. A digital interface apparatus operable to transmit and receive digital data via a serial bus, the digital interface apparatus comprising:

a transmission timing controller for generating a clock select signal which selects one of first and second clocks, each of said first and second clocks having a different frequency, according to a supplied mode signal, and generating timing signals by using a supplied frame signal;

a transmission memory on which data to be transmitted is recorded in synchronization with the clock selected by the clock select signal according to the timing signals supplied from the transmission timing controller and from which the recorded data is output in synchronization with a third clock;

control means for generating the third clock, adding additional information to the data output from the transmission memory to then be transmitted via the serial bus, receiving data transmitted via the serial bus, and restoring a frame signal from information added to the received data;

a reception timing controller for generating the clock select signal which selects one of the first and second clocks according to the supplied mode signal, and generating timing signals by using the frame signal restored by the control means; and a reception memory on which data output from the control means is recorded in synchronization with the third clock supplied from the control means, according to the timing signals supplied from the reception timing controller, and from which the recorded data is output in synchronization with the clock selected by the clock select signal generated by reception timing controller.

7. A digital interface apparatus operable to transmit and receive digital data via a serial bus, the digital interface apparatus comprising:

a transmission timing controller for generating a clock select signal which selects one of first and second clocks, each of said first and second clocks having a different frequency, according to a supplied mode signal, and generating timing signals by using a supplied frame signal;

a transmission memory on which data to be transmitted is recorded in synchronization with the clock selected by the clock select signal according to the timing signals supplied from the transmission timing controller and from which the recorded data is output in synchronization with a third clock;

control means for generating the third clock, adding additional information to the data output from the transmission memory to then be transmitted via the serial bus, receiving data transmitted via the serial bus, and restoring a frame signal from information added to the received data;

a reception timing controller for generating the clock select signal which selects one of the first and second clocks according to the supplied mode signal, and generating timing signals by using the frame signal restored by the control means; and a reception memory on which data output from the control means is recorded in synchronization with the third clock supplied from the control means, according to the timing signals supplied from the reception timing controller, and from which the recorded data is output in synchronization with the clock selected by the clock select signal generated by reception timing controller;

wherein one of said transmission timing controller and said reception timing controller generates the clock select signal for selecting said first clock when said mode signal indicates that compressed data is to be conveyed through the serial bus, and selecting said second clock when the said mode signal indicates that non-compressed data is to be conveyed through the serial bus.

8. The digital interface apparatus according to claim 6, wherein a data interface is implemented between a computer and one of a digital VCR and a digital camcorder.

* * * * *